(12) United States Patent
Cocault-Duverger et al.

(10) Patent No.: US 10,989,331 B2
(45) Date of Patent: Apr. 27, 2021

(54) METHOD FOR THE OFFSHORE INSTALLATION OF A PREHEATED DOUBLE-WALLED UNDERWATER PIPE FOR TRANSPORTING FLUIDS

(71) Applicant: SAIPEM S.A., Montigny le Bretonneux (FR)

(72) Inventors: Vincent Cocault-Duverger, Herbeville (FR); Antoine Jardin, Versailles (FR); Vincent Chojnacki, Suresnes (FR)

(73) Assignee: SAIPEM S.A., Montigny le Bretonneux (FR)

( * ) Notice: Subject to any disclaimer, the term of this patent is extended or adjusted under 35 U.S.C. 154(b) by 132 days.

(21) Appl. No.: 16/337,541

(22) PCT Filed: Sep. 28, 2017

(86) PCT No.: PCT/FR2017/052649
§ 371 (c)(1),
(2) Date: Mar. 28, 2019

(87) PCT Pub. No.: WO2018/060637
PCT Pub. Date: Apr. 5, 2018

(65) Prior Publication Data
US 2020/0032926 A1    Jan. 30, 2020

(30) Foreign Application Priority Data

Sep. 29, 2016    (FR) .................................... 1659307

(51) Int. Cl.
*F16L 1/15*    (2006.01)
*F16L 1/20*    (2006.01)
(Continued)

(52) U.S. Cl.
CPC ..................... *F16L 1/15* (2013.01); *F16L 1/20* (2013.01); *F16L 9/20* (2013.01); *F16L 53/34* (2018.01); *F16L 2201/40* (2013.01)

(58) Field of Classification Search
CPC ..... F16L 1/15; F16L 1/20; F16L 53/34; F16L 9/20; F16L 2201/40
See application file for complete search history.

(56) References Cited

U.S. PATENT DOCUMENTS 3,964,754 A * 6/1976 Murai et al. .............. F16L 7/02
277/621
4,124,040 A * 11/1978 Miller ...................... F16L 3/00
138/109

FOREIGN PATENT DOCUMENTS

EP    0 574 500    12/1993
GB    2 492 883    1/2013
(Continued)

*Primary Examiner* — Tara Mayo-Pinnock
(74) *Attorney, Agent, or Firm* — Cozen O'Connor

(57) ABSTRACT

A method of installing at sea a double-walled preheated undersea pipe for transporting fluids, wherein for each new pipe section to be assembled to a pipe that is already installed at sea: the method involves preheating the inner wall unit element inside the outer wall unit element of the new pipe section; assembling the inner wall unit elements of the new pipe section to the inner wall of the pipe that is already installed at sea; assembling the outer wall unit element of the new pipe section to the outer wall of the pipe that is already installed at sea; lowering the new pipe section into the sea; and repeating the above for other new pipe sections to be assembled so as to prestress the pipe while it is being installed at sea.

9 Claims, 2 Drawing Sheets

(51) Int. Cl.
  *F16L 53/34*    (2018.01)
  *F16L 9/19*    (2006.01)

(56) References Cited

FOREIGN PATENT DOCUMENTS

| WO | WO 2011/037459 | 3/2011 |
| WO | WO 2016/128655 | 8/2016 |
| WO | WO 2016/128656 | 8/2016 |

\* cited by examiner

METHOD FOR THE OFFSHORE INSTALLATION OF A PREHEATED DOUBLE-WALLED UNDERWATER PIPE FOR TRANSPORTING FLUIDS

PRIORITY CLAIM

This is a U.S. national stage of application No. PCT/FR2017/052649, filed on Sep. 28, 2017. Priority is claimed on France Application No. FR1659307, filed Sep. 29, 2016, the content of which is incorporated herein by reference.

BACKGROUND OF THE INVENTION

The present invention relates to the general field of installing at sea undersea pipes that rest on the sea bottom or that provide a bottom-to-surface connection for transferring hydrocarbons, e.g. oil and gas, coming from undersea production wells.

The invention relates more precisely to double-walled undersea pipes of the "pipe-in-pipe" (PIP) type in which an inner wall transports the fluids and an outer wall coaxial with the inner wall is in contact with the ambient medium, i.e. with sea water.

The annular space between the two walls may be filled with an insulating material, or it may be evacuated of any gas so as to provide thermal insulation for the fluids flowing in the inner pipe. Such undersea coaxial pipes are particularly used in the context of installations at great depths where the temperature of the water is typically 4° C.

Generally, double-walled undersea pipes are assembled on land as a plurality of pipe sections referred to as "strings", with each pipe section being made from a plurality of unit pipe elements, having a length of 10 meters (m) to 1000 m depending on the load-holding capacity of the laying system. These pipe sections are then transported at sea on a laying ship where they are connected to one another progressively as they are laid at sea (by J-lay, by S-lay, by being unwound, or by means of floating sections).

Laying techniques require each new pipe section to be connected to the pipe that is already installed at sea prior to lowering the new pipe section into the sea and moving the laying ship forwards. This connection step typically takes place by butt-welding together the steel free ends of the respective inner and outer walls of the new pipe section and of the pipe that is already installed at sea.

During laying, the inner walls of the various pipe sections become compressed under their own weight and they transmit these forces to the outer wall of the pipe. This prestress induced during J-laying limits the strength of the pipe as it passes through the bend zone before resting on the sea bottom. It is then necessary to add mechanical connection elements of the bulkhead type in order to limit the prestress. Nevertheless, adding such mechanical connection parts presents numerous drawbacks. In particular, adding those parts lengthens ship time because of the need to assemble half-shells on the outer wall of the pipe at the locations of the mechanical connection parts. In addition, those half-shells are typically assembled together by means of a weld bead of quality that is not good. Furthermore, the presence of such mechanical connection elements on the pipe adds cold points along its length.

Furthermore, when the pipe installed on the sea bottom is in service and the temperature of the fluid that it transports reaches temperatures that are moderate to high (of the order of 50° C. to 150° C.), the increase in temperature causes the inner walls of the various pipe sections to expand relative to their outer walls, which are cooler (because they are in contact with sea water at a low temperature of about 3° C. to 5° C.). That expansion of the inner walls of the pipe sections leads to the inner wall being compressed, since it is held firmly at each end of the undersea pipe by elements for closing the annular space between the two walls. If this buckling becomes concentrated in one section of the pipe, it leads to bending forces that can destroy the structure. It is therefore necessary to ensure that the expansion of the pipe is distributed over buckling zones in order to avoid such concentration.

Document WO 2007/096548 discloses a method of fabricating a coaxial pipe element comprising an inner pipe and an outer pipe with an annular space formed between those pipes and closed at each of its ends. That fabrication method is characterized in that the inner pipe is subjected to mechanical traction stress between the closed ends of the annular space while the inner pipe is not in service.

That fabrication method applies more specifically to coaxial pipes in which the annular space between the inner pipe and the outer pipe is closed, either by swaging, i.e. by deforming the terminal portion of the outer pipe so as to connect it directly to the surface of the inner pipe, or else by connecting a junction part either directly or else via two half-shells forming a tubular sleeve interposed between the ends of the outer pipe and of the junction part. Once the traction stress has been applied to one end of the inner pipe, the annular space at that end is closed.

The fabrication method described in that document thus applies to coaxial pipes that necessarily need recourse to fastener parts between the inner and outer pipes of each pipe section.

Document GB 2 492 883 discloses a method of installing a pipe in which prestress is exerted on the unit elements of the inner wall while assembling pipe sections (or strings) on land. Nevertheless, such an installation method presents the drawback of needing recourse to mechanical connection elements between the various pipe sections, with all the drawbacks that such mechanical connection elements include.

OBJECT AND SUMMARY OF THE INVENTION

A main object of the present invention is thus to propose a method of installing an undersea pipe at sea that does not present the above-mentioned drawbacks.

In accordance with the invention, this object is achieved by a method of installing at sea a double-walled preheated undersea pipe for transporting fluids, said pipe comprising a plurality of pipe sections assembled together at sea successively one after another, each pipe section being obtained by assembling together on land at least two inner wall unit elements for receiving the fluid that is to be transported and at least two outer wall unit elements that are assembled coaxially around the inner wall unit elements, the outer wall unit elements being assembled around the inner wall unit elements without adding any mechanical connection element, the method comprising in succession, for each new pipe section that is to be assembled to the pipe that is already installed at sea:

a step of preheating the inner wall unit elements inside the outer wall unit elements of the new pipe section;

a step of assembling one end of the inner wall unit elements of the new pipe section to the inner wall of the pipe that is already installed at sea;

a step of assembling one end of the outer wall unit elements of the new pipe section to the outer wall of the pipe that is already installed at sea;

a step of lowering the new pipe section into the sea; and repeating the above steps for other new pipe sections that are to be assembled so as to prestress the pipe while it is being installed at sea.

The method of the invention is remarkable in particular in that it makes provision to induce a prestress force in tension in the pipe progressively as the pipe is being installed at sea by preheating the inner wall unit elements of the new pipe section. This prestress force is thus applied successively to all or to some of the pipe sections at the same time as they are being installed at sea directly from the laying ship.

The preheating of the inner wall unit elements of the pipe sections is applied so as to initiate tension present in the pipe while it is being laid. As a result, during production stages (i.e. while the inner wall of the pipe is carrying the fluids that are to be transported), this tension prestress serves to reduce the compression of the pipe, thereby minimizing any risks of the pipe buckling.

By minimizing any risks of the pipe buckling, it becomes possible to reduce or even to eliminate buckling control systems. Likewise, it is possible to reduce (or even eliminate) the extra thicknesses for pipe sections that are likely to be subjected to buckling. The duration of the offshore campaign can also be reduced.

Furthermore, the method of the invention makes it possible to simplify managing the differential compacting that takes place between the two pipe walls. Specifically, the reduction in the length of the inner wall under the effect of its own weight compared with the lengthening of the outer wall under the combined effect of the weight of both walls can be reduced.

One end of the inner wall unit elements of each new pipe section may be held centered inside the corresponding outer wall unit elements by means of a self-centering and anti-slip device.

Under such circumstances, after the step of lowering each new pipe section into the sea, the self-centering and anti-slip device is advantageously activated.

The preheating of the inner wall unit elements of each new pipe section may be performed by induction heating of said inner wall unit elements.

In a variant implementation, the pipe is installed at sea by means of a laying ship having a J-lay tower;

the step of preheating the inner wall unit elements of each new pipe section is performed with the inner wall unit elements in a substantially horizontal position;

the step of assembling the inner wall unit elements of each new pipe section to the inner wall of the pipe that is already installed at sea comprises raising said inner wall unit elements in the J-lay tower in order to tilt them into a substantially vertical position;

the step of assembling the outer wall unit elements of each new pipe section to the outer wall of the pipe that is already installed at sea comprises previously sliding the outer wall unit elements relative to the inner wall unit elements; and the step of lowering each new pipe section into the sea comprises causing the laying ship to move forwards by an amount corresponding substantially to the length of the pipe section.

Advantageously, the inner wall unit elements of some of the pipe sections may be assembled to the inner wall of the pipe that is already installed at sea without previously being subjected to preheating. During a production stage, those pipe sections in which the inner wall unit elements were not preheated (i.e. were not prestressed in traction while being laid) become compressed at a level of axial force that is less than in the preheated pipe section. Such non-prestressed pipe sections present a critical buckling force that is less than that of the prestressed pipe sections. By not preheating the inner wall unit elements of some of the pipe sections, it is possible to trigger buckling of the pipe at points that are predefined during its design, thereby distributing the operating temperature elongations in zones of controlled buckling at regular intervals over the entire line. As a result, it is possible to omit auxiliary structures or parts that are particularly expensive and that are commonly added along a pipe in order to give rise to buckling of the pipe.

In another variant implementation, the step of preheating the inner wall unit elements of each new pipe section is performed by electrically heating the inner wall unit elements by means of electric heater cables extending over the entire length of the inner wall unit elements.

In this variant, prior to the step of assembling a free end of the outer wall unit elements of each new pipe section to the outer wall of the pipe that is already installed at sea, the method may comprise a step of electrically connecting the electric heater cables of the inner wall unit elements to the electric heater cables of the inner wall unit element of the preceding pipe section.

Under such circumstances, electric heating of the inner wall unit element of the pipe sections that have been installed is advantageously maintained throughout the installation at sea of the pipe, and then the electric heating is deactivated once the complete pipe has been made on board the laying ship and then installed on the sea bottom.

BRIEF DESCRIPTION OF THE DRAWINGS

Other characteristics and advantages of the present invention appear from the following description given with reference to the accompanying drawings, which show an embodiment having no limiting character. In the figures.

DETAILED DESCRIPTION OF THE INVENTION

The invention applies to laying (i.e. installing at sea) a double-walled undersea pipe of the "pipe-in-pipe" (PIP) type, i.e. a pipe that comprises an inner wall for transporting hydrocarbons coming from production wells, and an outer wall arranged around the inner wall, being coaxial therewith, and serving to come directly into contact with the surrounding sea water.

This type of undersea pipe is typically used in the offshore production of hydrocarbons at great depth. In the context of such installations, the double-walled pipes may be assembled on land as a plurality of pipe sections, each pipe section being made up of a plurality of elements of unit length (which sections are also referred to as "strings"), having a length in the range 10 m to 100 m depending on the holding capacity of the laying system, the unit pipe elements being assembled together without having recourse to bulkhead type mechanical connection elements (connection forgings).

During (J- or S-) laying, the pipe sections are connected to one another on board the ship progressively during installation at sea. More precisely, with J-laying, the undersea pipe is typically lowered from the laying ship practically vertically (at an angle in the range +30° to −10° relative to the vertical). This almost vertical inclination of the pipe decreases progressively as it moves downwards until it takes on the slope of the sea bottom. With S-laying, the undersea pipe is typically lowered from the laying ship practically horizontally, after which it becomes curved in order to reach the sea bottom.

FIGS. 1 to 5 show the various steps of J-laying in an implementation of the method of the invention for installation at sea.

Figure 1:
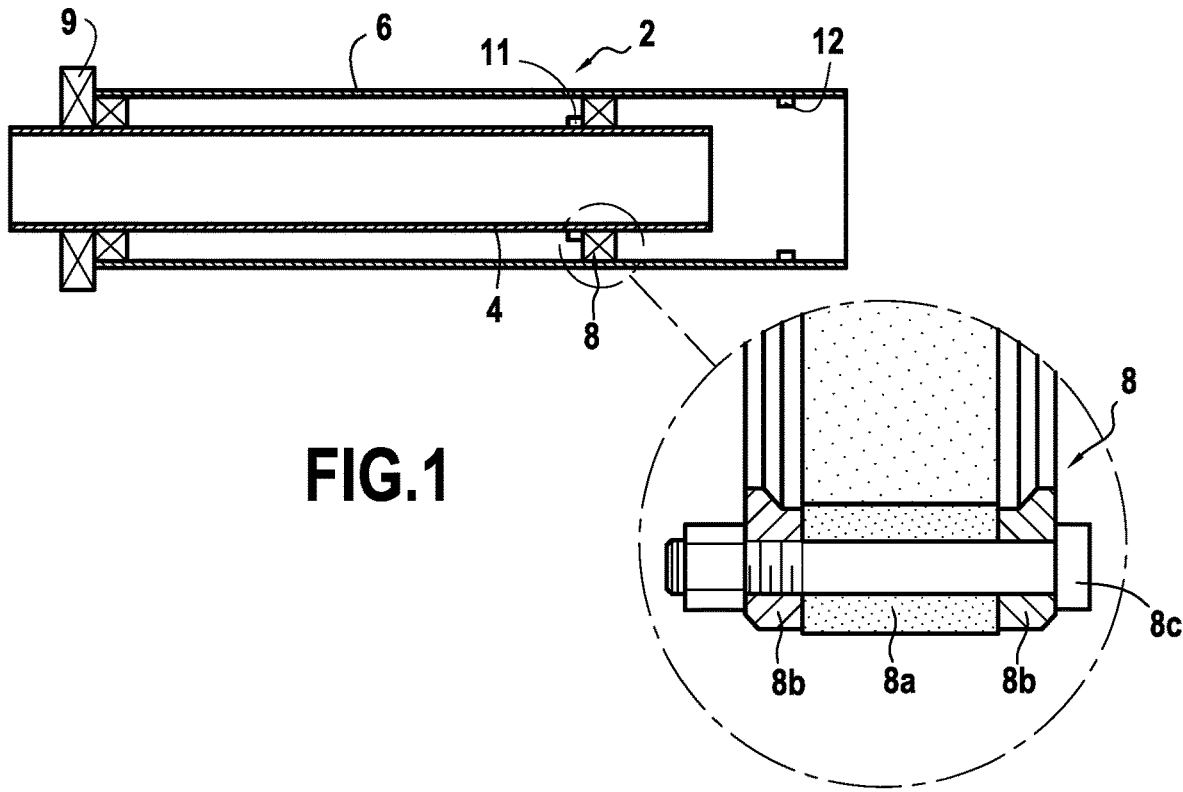
FIGS. 1 to 5 show the method of installation in an implementation of the invention as applied to J-laying an undersea pipe.
Figure 2:
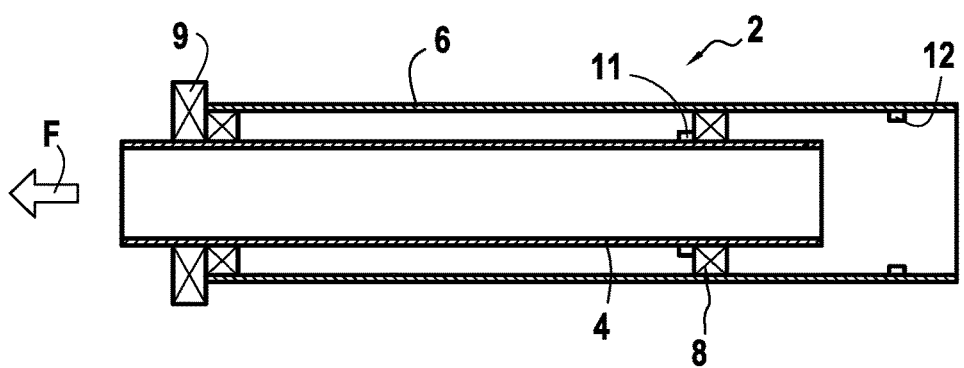

FIG. 1 shows a new pipe section 2 in a horizontal position that is to be assembled onto the portion of pipe that is already installed at sea.

This pipe section 2 comprises a plurality of inner wall unit elements 4 made of steel that are to receive the fluid to be transported, and a plurality of outer wall unit elements 6 that are assembled around the inner wall unit elements, so as to be coaxial thereabout.

This pipe section 2 is obtained by sliding inner wall unit elements 4 inside outer wall unit elements 6 while interposing between those elements a self-centering and anti-slip device 8 at one of their ends, with the device being in a deactivated state. At the other end of the inner wall unit elements 4, an installation-assisting collar 9 serves to hold the pipe section 2, since it might slip relative to the outer wall unit elements 6.

An example of such a self-centering and anti-slip device is described in patent application WO 2016/128655. Typically, the device 8 comprises a ring of elastomer material 8a sandwiched between two annular metal plates 8b of inside diameter corresponding substantially to the diameter of the inner wall unit elements and of outside diameter corresponding substantially to the diameter of the outer wall unit elements. Clamping means (e.g. of the nut-and-bolt type 8c) serve to clamp the plates together in order to compress the ring of elastomer material.

At the following step of the method (FIG. 2), provision is made to preheat the inner wall unit elements 4 of the resulting pipe section 2.

This preheating step is performed on board the laying ship, when assembling the new pipe section onto the portion of pipe that is already installed at sea.

The inner wall unit elements 4 made of steel may be preheated by induction heating said inner wall unit elements. It is thus possible to have recourse to electrical heating arranged inside the inner wall unit elements, this heating giving rise to expansion and thus to axial lengthening F of the inner wall unit elements relative to the outer wall unit elements (which are not subjected to the preheating).

By way of example, the electrical induction heating is in the form of one or more carriages, each carrying a wound ferrite core that is electrically powered, the carriages being moved inside the inner wall unit elements in order to heat them by means of the magnetic field generated by the wound ferrite core. With this type of device, in order to obtain a temperature rise of 130° C. for steel inner wall unit elements having a length of 48 m, an outside diameter of 273 millimeters (mm), and a thickness of 20 mm, the preheating time is about 30 minutes (min).

By way of example, preheating is applied to cause its inner wall unit elements to reach a temperature of about 150° C., thereby causing said elements to lengthen by 0.075 m for a pipe section that is 48 m long. In terms of prestress, this lengthening is equivalent to a traction tension on the inner wall unit elements of 323 megapascals (MPa). For a steel of API 5L X60 grade, i.e. having an elastic limit of 413 MPa, this thus produces a traction loading of 78%.

During the following step (FIG. 3), once the inner wall unit elements 4 of the new pipe section 2 have been preheated to the desired temperature, they are assembled to the inner wall 4' of the pipe 10 that is already installed at sea.

For this purpose, the inner wall unit elements of the pipe section 2 are placed in the J-lay tower (not shown in the figures) in order to be tilted into a substantially vertical position (typically lying in the range +30° to −10° relative to the vertical).

Figure 3:
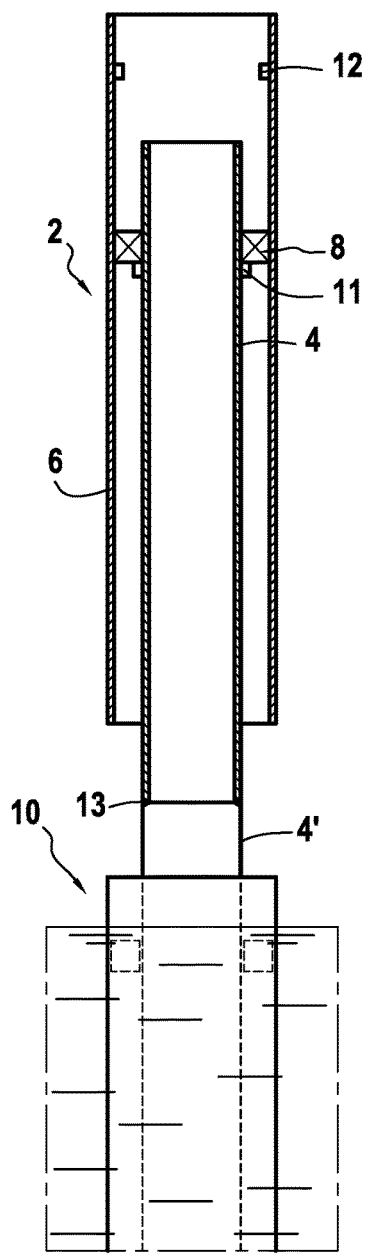

Once in the laying tower, the bottom end of the inner wall unit elements 4 is welded to the top end of the inner wall unit element 4' of the pipe 10 that is already installed at sea (the weld bead 13 can be seen in FIG. 3). This welding operation is itself known and is therefore not described in detail herein. It is performed between the inner wall unit elements 4 and 4'. During this step, the heat loss from the inner wall unit elements 4 that have been preheated is typically 1 kelvin (K) per hour (h) (with steel inner wall unit elements having a length of 48 m, an outside diameter of 273 mm, and a thickness of 20 mm, and with a heat exchange factor of 1 watt per square meter per kelvin ($W/m^2/K$)).

Figure 4:
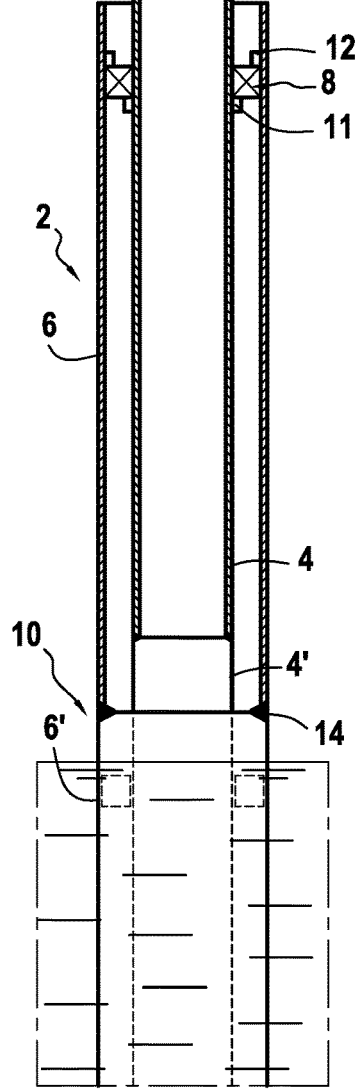

As shown in FIG. 4, and in known manner, the outer wall unit elements 6 of the new pipe section 2 are then slid downwards (relative to the inner wall unit elements) in order to be assembled by welding to the outer wall unit elements 6' of the pipe 10 that is already installed at sea (the weld bead 14 can be seen in FIG. 4).

Figure 5:
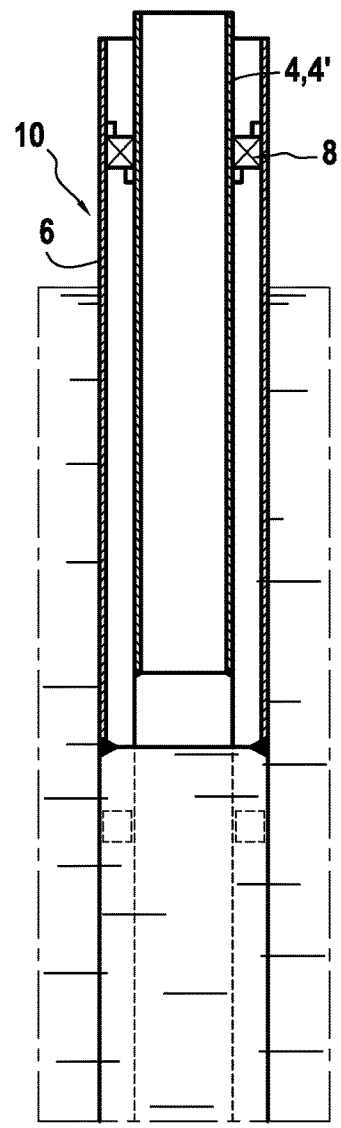

Once the outer wall unit elements 6 of the new pipe section 2 have been welded to the outer wall unit elements of the pipe already installed at sea, the new pipe section 2 is lowered vertically into the sea while moving the laying ship forwards through a distance equal to the length of that pipe section 2 (FIG. 5).

Prior to repeating the steps described above with reference to FIGS. 1 to 5 on a new pipe section for assembling to the preceding pipe section, the self-centering and anti-slip device 8 as described in patent application WO 2016/128655 for anchoring one end of the inner wall unit elements to the outer wall unit elements is activated, i.e. the plates of the device are clamped together in order to compress the elastomer material to the required level, this clamping force enabling the self-centering and anti-slip device to take up the force that is exerted as a result of the inner wall unit elements cooling down to the temperature of the sea bottom (4° C.)

More precisely, means are provided to enable the self-centering and anti-slip device 8 to take up the force that is exerted on cooling of the inner wall unit element. For example, an inner annular shoulder 11 carried by the inner wall unit element 4 and an outer annular shoulder 12 carried by the outer wall unit element 6 serve to block the self-centering and anti-slip device 8 axially in position once the inner wall unit element has cooled (see FIG. 4 in particular).

The above-described example of the method of the invention applies to J-laying an undersea pipe. Naturally, the invention also applies to S-laying, to unwinding, or to laying floating sections of such a pipe. In known manner, and in particular with S-laying, the undersea pipe is typically lowered from the laying ship practically horizontally and then becomes curved in order to reach the sea bottom.

In another implementation of the invention (not shown in the figures), the inner wall unit elements of each new pipe section for assembling to the pipe that is already installed at sea is preheated by electrically heating the inner wall unit elements by means of a plurality of electric heater cables extending over the entire length of the inner wall unit elements.

More precisely, the electric heater cables are cables that are typically located in the annular space between the inner and outer walls of the pipes by being run along the inner wall over its entire length. These cables are thus electric cables that are wound around the inner wall in order to heat it by the Joule effect. This technique, known as heat tracing, serves to heat the fluids being transported in undersea pipes to a temperature higher than a critical threshold and over their entire travel from the production well to the installation on the surface (thus avoiding troublesome phenomena appearing in the pipes so as to maintain good flow conditions).

In the present invention, it is advantageously possible to make use of these electric heater cables for heating the inner wall unit elements of each new pipe section so as to lengthen them by expansion while they are being installed at sea.

For this purpose, prior to the step of assembling one end of the outer wall unit elements of each new pipe section to the outer wall of the pipe that is already installed at sea, the method of the invention includes a step of electrically connecting the electric heater cables of the inner wall unit elements to the electric heater cables of the inner wall unit elements that have already been installed at sea.

Preferably, this connection is performed by means of male and female connectors of the kind described in patent application WO 2016/128656. Having recourse to such connectors makes it possible to ensure electrical continuity between the cables of each new pipe section and the cables of the pipe that is already installed at sea, which technique is simple, quick, and effective.

During this installation method, the electric heating of the inner wall unit elements of the various pipe sections that have been installed is maintained throughout the installation at sea of the pipe (the inner wall of the pipe is prestressed throughout the laying of the pipe). Once the complete pipe has been built up on the laying ship, it is possible to deactivate the electric heating so as to interrupt the electrical power supply for maintaining the temperature of the inner wall unit elements. Naturally, the heater cables can be used later on in the usual way during production in order to keep the fluids being transported at a temperature higher than a critical threshold.

It should be observed that the installation method in this implementation by electric heating could also be applied to installing a pipe that is single-walled (i.e. not having an outer wall). Under such circumstances, the electric preheating of the various pipe sections while they are being laid serves to ensure that the pipe is prestressed, with this prestress being taken up at the end of the laying operation by the ground on which the pipe rests.

It should also be observed that the inner wall unit elements of certain pipe sections may be assembled to the inner wall of the pipe that has already been laid at sea without previously being subjected to preheating (with only some of the pipe sections being subjected to preheating of their inner walls). This variant implementation serves to obtain a controlled buckling trigger.

For example, for a coaxial pipe having an inside diameter of 8 inches (") and an outside diameter of 14", with a length of 8.5 kilometers (km) at a depth of 1300 m, an initial prestress comprising about 0.02% deformation is applied during the installation method of the invention. If an internal pressure of the system in operation is 260 bars absolute (bara) and a temperature of 100° C. are applied, then the structure requires three buckling migration systems, typically in the form of 16 (metric) tonne (t) metal structures that trigger buckling at those positions. Applying different prestresses in defined sections makes it possible to avoid using such structures, since their function is performed by zones where the installation prestress is maintained, thus becoming zones of preferred instability for buckling. For a project having three sections of this type, this method also makes it possible to reduce the number of uniformly spaced mechanical connection parts (bulkheads) to six instead of eleven. Eliminating such mitigation structures serves to simplify the stages of installing undersea pipes by eliminating preparatory stages for installing those structures. Reducing the number of mechanical connection parts also makes it possible to reduce the time taken at sea in order to construct the pipe, and thus reduce its costs.

The presently-described invention and its use for finely controlling acceptable bending can also be used in zones where the natural terrain is chaotic. Certain sea bottoms are uneven and lead to long free spans of the pipe. With double-walled pipes, the problem with such free spans is made worse by the weight of the coaxial pipe, and potentially requires expensive support structures or riprap. Suitably selected prestressing of certain zones of the pipe thus makes it possible to reduce the critical nature of free spans by controlling the critical bending of the two tubes, and thus usefully limiting support structures. This can be particularly advantageously when passing over undersea cliffs, for example. The same invention and the same principle also apply to zones that are subjected to fishing where potentially catching fishing equipment can subject the pipe to a large amount of bending or can trigger uncontrolled buckling of the pipe.

It should also be observed that limiting the bending induced by the pipe buckling and thus managing the buckling of the pipe becomes particularly critical with jacketed tubes. In order to strengthen corrosion resistance properties, it is known to have recourse to coaxial pipes in which the inner tube is lined in a fine layer of material having special properties, e.g. 625 or 825 type alloys. One method of constructing these tubes consists in inserting a lining in the inner pipe, which lining is mechanically bonded to the pipe and also to its ends. Problems of the lining collapsing are well known. This bending limitation applies likewise to the operational stage in the event of the flow being stopped in the pipe. The pressure inside the pipe drops even though the buckling pipe is still subjected to bending due to the temperature of its walls decreasing more slowly than the pressure. This effect can lead to irreversible collapse of the inner lining and make the structure inoperable. The presently-described invention thus makes it possible usefully to limit the bending of the line by fine control over prestress.

The invention claimed is:

1. A method of installing at sea a double-walled undersea pipe for transporting high temperature fluids during use of the pipe after installation and which causes heating of the pipe during the transporting, said pipe comprising a plurality of pipe sections assembled together at sea successively one after another, each pipe section being obtained by assembling together on land at least two inner wall unit elements for receiving the fluid that is to be transported and at least two outer wall unit elements that are assembled coaxially around the inner wall unit elements, the outer wall unit elements being assembled around the inner wall unit elements without adding any mechanical connection element, the method comprising in succession, for each new pipe section that is to be assembled to the pipe already installed at sea, the installation method comprising:

preheating, for at least some of the new pipe sections, the inner wall unit elements inside the outer wall unit elements;

assembling a free end of the inner wall unit elements of the new pipe section to the inner wall element of the pipe that is already installed at sea;

assembling a free end of the outer wall unit elements of the new pipe section to the outer wall element of the pipe that is already installed at sea;

lowering the new pipe section into the sea; and repeating the above for other new pipe sections that are to be assembled so as to prestress the pipe while it is being installed at sea.

2. The method according to claim 1, wherein one end of the inner wall unit elements of each new pipe section is held centered inside the corresponding outer wall unit element by means of a self-centering and anti-slip device.

3. The method according to claim 2, wherein, after the step of lowering each new pipe section into the sea, a self-centering and anti-slip device is activated.

4. The method according to claim 1, wherein the preheating of the inner wall unit elements of each new pipe section is performed by induction heating of said inner wall unit elements.

5. A method according to claim 1, wherein the pipe is installed at sea by means of a laying ship having a J-lay tower;

wherein preheating the inner wall unit elements of each new pipe section is performed with the inner wall unit elements in a substantially horizontal position;

wherein assembling the inner wall unit elements of each new pipe section to the inner wall element of the pipe that is already installed at sea comprises raising said inner wall unit elements in the J-lay tower in order to tilt them into a substantially vertical position;

wherein assembling the outer wall unit elements of each new pipe section to the outer wall element of the pipe that is already installed at sea comprises previously sliding the outer wall unit elements relative to the inner wall unit elements; and wherein lowering each new pipe section into the sea comprises causing the laying ship to move forwards by an amount corresponding substantially to the length of the pipe section.

6. The method according to claim 1, wherein some the inner wall unit elements of some of the pipe sections are not subjected to preheating.

7. The method according to claim 1, wherein preheating the inner wall unit elements of each new pipe section is performed by electrically heating the inner wall unit elements by means of electric heater cables extending over the entire length of the inner wall unit elements.

8. The method according to claim 7, wherein, prior to assembling a free end of the outer wall unit elements of each new pipe section to the outer wall element of the pipe that is already installed at sea, the method further comprises electrically connecting the electric heater cables of the inner wall unit elements to the electric heater cables of the inner wall unit element of the preceding pipe section.

9. The method according to claim 8, wherein electric heating of the inner wall unit element of the pipe sections that have been installed is maintained throughout the installation at sea of the pipe, and then the electric heating is deactivated once the complete pipe has been made on board the laying ship and then installed on the sea bottom.

* * * * *